…

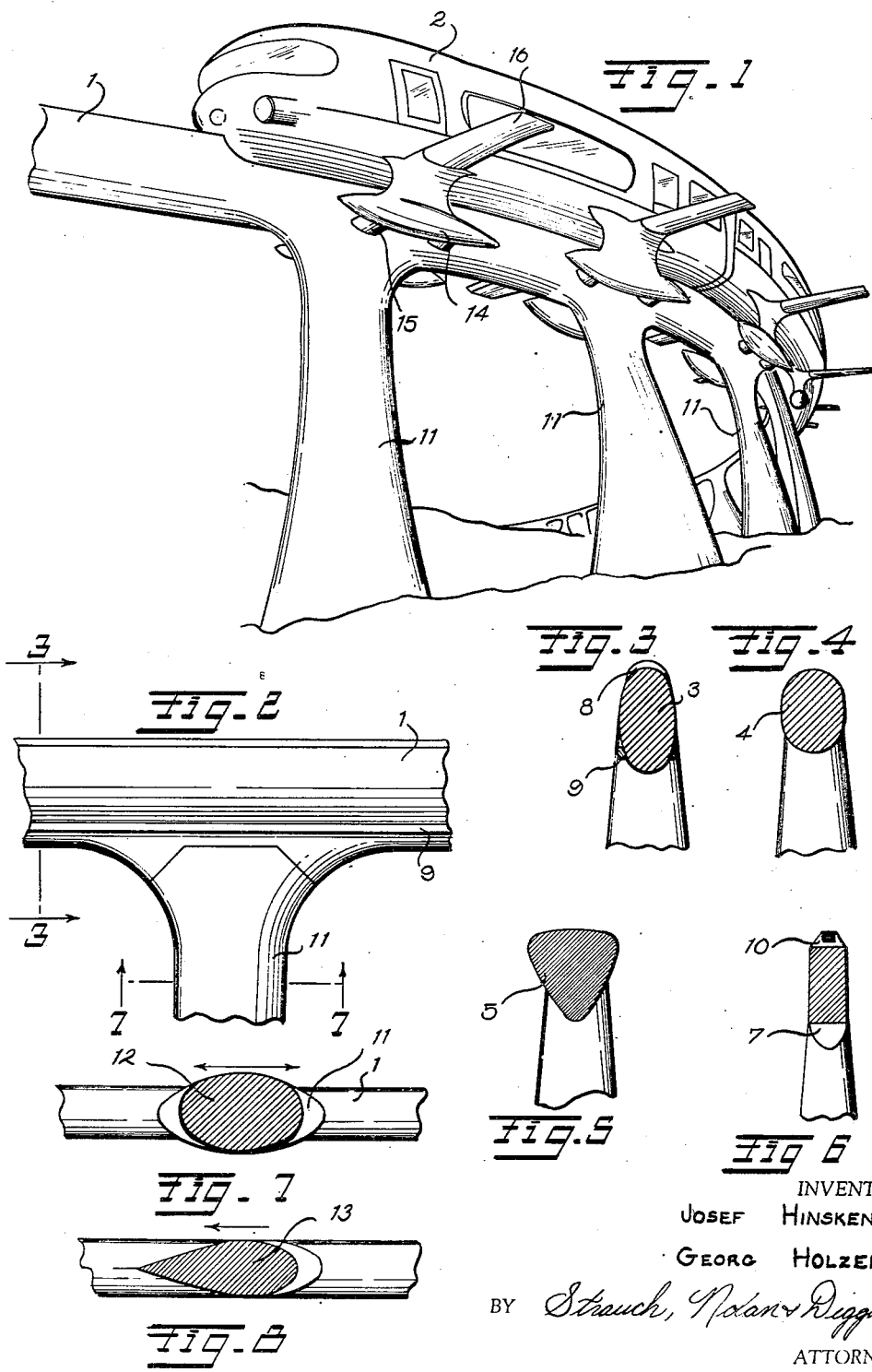

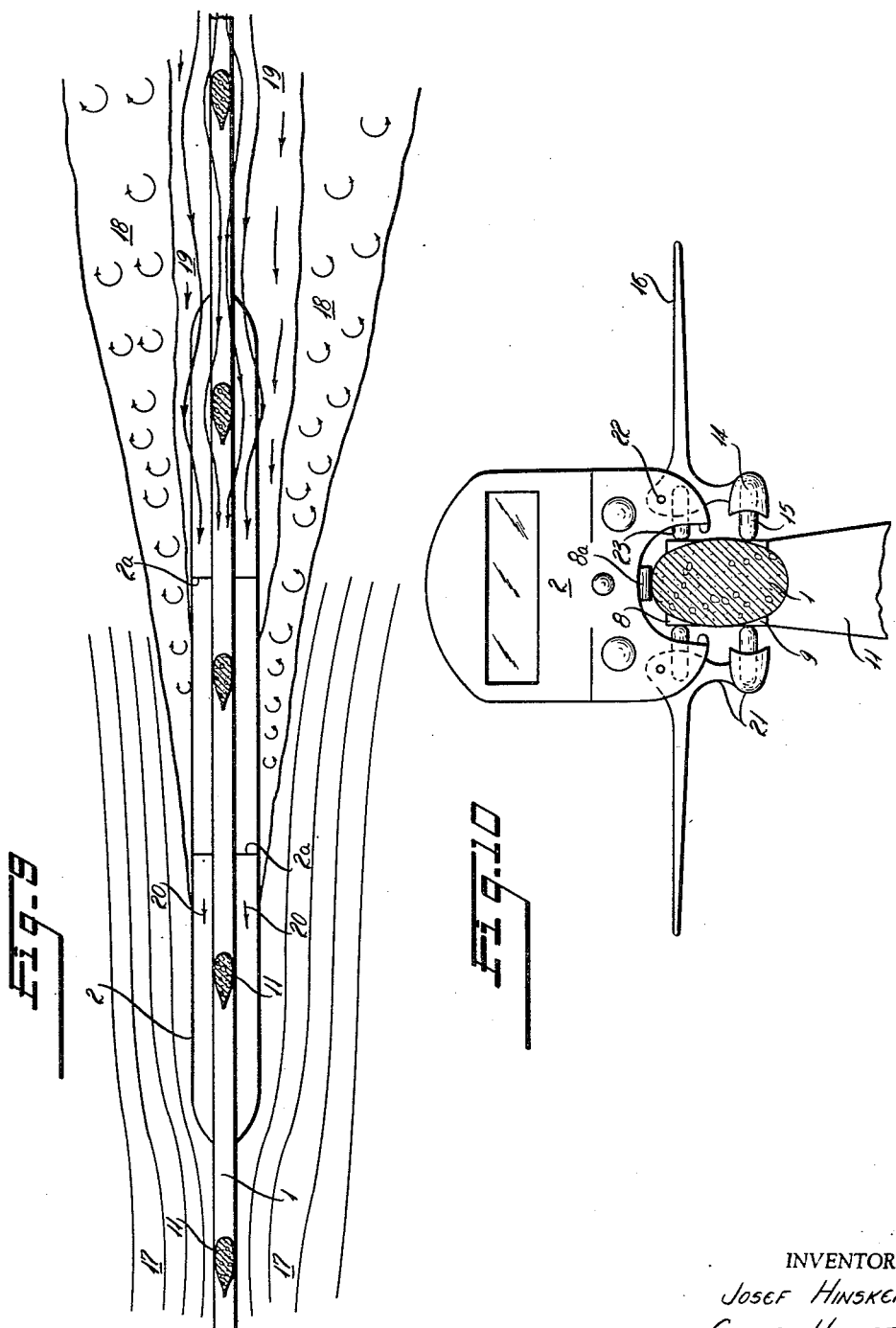

United States Patent Office 2,788,749
Patented Apr. 16, 1957

2,788,749

MUTUALLY STREAMLINED SUPPORTING STRUCTURE AND MONORAIL VEHICLE

Josef Hinsken, Koln-Merheim, and Georg Holzer, Furstenfeldbruck, near Munich, Germany, assignors to Axel Lennard Wenner-Gren, Mexico City, Mexico Application January 10, 1952, Serial No. 265,893

6 Claims. (Cl. 104—118)

This invention relates to railway constructions and more particularly to improved vehicle and track assemblies of the so-called monorail type.

Many systems have been proposed in the past for transporting freight or passengers speedily and economically. At the present time, conventional two-rail railway systems have been used most successfully for transporting large quantities of freight. Despite the improvements in such systems they have been and probably will be limited to speeds in the neighborhood of sixty miles per hour. Because of their higher speeds aircraft have been increasingly used for the transportation of freight. However, the weight which presently known and contemplated aircraft will carry economically is quite limited.

It has also been proposed, in an effort to lower the operating costs of railway constructions, to utilize a single rail for supporting the vehicles in lieu of the conventional two-rail system. Such vehicles usually incorporate guiding means or stabilizers such as gyroscopes to maintain the vehicle in an upright position. These auxiliary devices have not in general proved satisfactory because of their increased installation and operating costs, the lack of reliability and finally because they do not permit a sufficient increase speed of the vehicles to warrant their additional cost.

It is, accordingly, an object of the present invention to provide improved railway systems which are capable of transporting large quantities of freight at high speeds and wherein the support structure on which the vehicle runs as well as the vehicle itself are so constructed as to minimize the air resistance and facilitate economical travel at high speed. Further, in accordance with the present invention, the vehicles and support structure are so constructed that the movement of air around the vehicle, over the supporting structure, and between the vehicle and the supporting structure is effected with minimum loss.

While it is well known that streamlining may be utilized to increase the speed at which a vehicle may travel at a given power input it has not been generally recognized that a significant part of the resistance to movement of the vehicle is caused by the passage of air over the surface of the track or other supporting structure and insofar as known no attempt has been made to correlate the streamlining of the vehicle with streamlining of the supporting structure. In accordance with the present invention, the construction of the vehicle and the supporting structure are correlated in a unique manner, each being streamlined in a manner to minimize the total resistance to the flow of air around the vehicle and the supporting structure occasioned by high speed movement of the vehicle over the supporting structure.

In monorailways special "rails" are not absolutely necessary. On the contrary, the supporting structure on which the vehicles ride preferably serve directly and as a whole for guiding and supporting the vehicles. The streamlining of this support structure, particularly in conjunction with the streamlining of the vehicles, in accordance with the present invention, makes it possible to operate such vehicles economically for transporting relatively heavy loads at speeds substantially higher than those now practical.

In accordance with another aspect of the invention the streamlined supporting structure is positioned at such a height above the ground that the slip stream or disturbances of the air resulting from operation of the vehicle at high speed on the support structure will not adversely affect the operation of the vehicle.

In accordance with the present invention, the streamlining of the supporting structure may be effected by modifying existing structures for example by providing suitable covers to provide surface smoothness and the desired contour. Surface smoothness may be obtained either by the use of appropriate basic material or by coating existing structures or suitable frameworks with appropriate material.

The vehicle according to the invention is at all times fully vertically supported by the support structure even during high speed travel. In addition the support structure absorbs unavoidable lateral forces produced by wind pressure and curves or by tilting movements of the vehicle. Preferably the supporting structure is provided with top surfaces for absorbing the vertical forces or the weight of the vehicle and side surfaces for absorbing tilting or lateral forces. If desired, the side guide wheels may be supported by lifting devices which effectively decrease the running friction between the side guide rollers or wheels and the supporting structure particularly at high speeds. The exact construction employed will depend upon the environment in which the system is used.

Additional features, objects and advantages of the invention will become apparent as the description proceeds in connection with the accompanying drawings in which:

Figure 1 is a perspective view of a train and supporting structure constructed in accordance with the present invention;

Figure 2 is a side elevation of a portion of the track structure;

Figures 3 through 6 are transverse sections of the main vehicle supporting beam taken along line 3—3 of Figure 2, Figure 3 showing the preferred form and Figures 4 through 6 showing modified constructions;

Figures 7 and 8 are horizontal sections through the pylons supporting the main track beam taken along the line 7—7 of Figure 2;

Figure 9 is a semi-diagrammatic view looking upwardly from a point beneath the vehicle and main supporting beam illustrating the flow of air around the track beam and vehicle; and Figure 10 is a front elevation of the vehicle shown in perspective in Figure 1.

Referring now more particularly to the drawings the support structure of the present invention is indicated generally at 1 and is adapted to support a train 2. As is more fully explained below the vehicle and the support structure are constructed as a streamlined unit to reduce the air friction at a high speed to a minimum. As shown in Figures 3, 4, 5, and 6 the support or trackway may have an elongated oval section 3, a more nearly circular section 4, a substantially triangular cross section 5 or a box-like section. In every case, however, it is important that the underside of the support beam be rounded. The rounded lower surface may be formed integrally with the beam or by an additonal section, such as indicated in 7 in Figure 6, applied to a rectangular beam. Further the upper trackways 8 and the side trackways are so constructed as to avoid or minimize air disturbances. The trackway elements 8 provide running surfaces for the main load carrying wheels 8a of the train 2 and the side surface of the track beam including the side trackways 9 provide running surfaces for the side guide wheels 23 and 15. The utilization of main wheels such as those shown in 8a and side guide wheels such as those shown 23 and 15 are known in the art for supporting vehicles of this type. If desired, a rail 10a may be provided for supporting the main wheels 8a of the vehicle. Such a rail may be mounted on the upper surface of the main beam by a rounded support structure enclosed by a cover 10.

The main beam way 1 is supported at a suitable elevation above the ground by the plurality of pillars or pylons 11. The transition portion connecting the main beam way 1 and the pylons 11 is smoothly curved and streamlined to permit the passage of air smoothly over this area. Also the pylons themselves are streamlined, the particular form of pylon being dependent upon the direction of motion of the train over the trackway. When the trackway is to accommodate movement of trains in both directions, the pylons will preferably be of elliptical section as indicated at 12 in Figure 7. When the track is designed to accommodate motion of a vehicle only in one direction, best results will be obtained by making the section 13 of pylon 11 tear-shaped as shown in Figure 8. As shown in Figure 8 the blunt portion of the tear-shaped section faces away from the direction of motion of the vehicle indicated by the arrow in Figure 8.

As shown in Figures 1 and 10 at least the lower side guide wheels 15 are mounted in streamlined support structures 14 and 21 which are mounted for pivotal movement on the vehicle body about axes parallel to the vehicle axis. If desired, the housings 14 and 21 may be formed integrally with laterally projecting wings 16 which stabilize the vehicle particularly during high speed operation and are also effective, because of their pivotal connection to the body, to move the wheels 15 away from the trackways 9 to reduce the rolling friction.

Figure 9 indicates the air flow pattern over the vehicle and the trackway as the vehicle is moving at high speed from right to left as viewed in Figure 9 as indicated by the arrow 20. Movement of the vehicle establishes three different air zones. In the first zone, indicated by the flow lines 17, there is substantially undisturbed flow around the streamlined vehicle and the air does not move relative to the beam. However, since the vehicle streamlining is not perfect, the air begins to separate from the surface of the train and forms turbulent areas in a second zone indicated at 18. These portions of the air separate very quickly from the train and produce an air flow which is carried along with the train in the third zone as indicated by the flow lines 19. It is for this reason that the beam and pylons are suitably streamlined. Thus it will be seen that there is a transition from a zone of air in which there is relative movement between the air and the train the passage of which is facilitated by streamlining of the train to a zone of air which moves relatively to the supporting structure, this flow of air being facilitated by the streamlined or aerodynamic shape of the supporting structure.

Air is also carried along within the channel formed between the train and the supporting structure. Flow of air with minimum disturbance and friction loss is facilitated in this region by the provision of smooth rounded surfaces particularly on the beam.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an elevated monorail railroad construction, the combination of a single elongated unitary beam, a vehicle disposed straddling said beam and having spaced opposed depending portions receiving said beam between them, a pillar supporting said beam, and means to facilitate movement of said vehicle in one direction of movement at high speed on said beam against the moving air masses incident to moving the vehicle at high speed, said means comprising means on said beam defining a smooth and rounded undersurface of said beam, means on the said depending portions of said vehicle defining curved surfaces on said vehicle cooperable with said beam to channel the moving air stream, and means defining an elliptical curved surface on the side of the pillar facing said vehicle advancing in said one direction of movement.

2. In an elevated monorail railroad constuction in which a vehicle straddles a beam, a supporting construction comprising a single elongated unitary beam, a pillar supporting said beam, and means to facilitate movement of a vehicle on said beam at high speed in one direction of movement of the vehicle against the moving air masses incident to moving the vehicle at high speed, said means comprising means on said beam defining a smooth and rounded undersurface of said beam, and means on said pillar defining an elliptical curved surface on the side of said pillar facing the advancing vehicle in its one direction of movement.

3. In an elevated monorail railroad construction in which a vehicle straddles a beam, a supporting construction comprising a single elongated unitary beam, a pillar supporting said beam, and means to facilitate movement of a vehicle on said beam at high speed against the moving air masses incident to moving the vehicle at high speed, said means comprising means on said beam defining a smooth and rounded undersurface of said beam, and said pillar being of elliptical cross section contiguous to its connection to said beam and in the path of the moving air stream.

4. In an elevated monorail railroad construction in which a vehicle straddles a beam, a supporting construction comprising a single elongated unitary beam, a pillar seated on the ground and extending vertically to engage said beam in supporting relation, and means to facilitate movement of a vehicle on said beam at high speed against the moving air masses incident to moving the vehicle at high speed, said means comprising means on said beam defining a smooth and rounded undersurface of said beam, means on said pillar defining elliptical curved surfaces contiguous to said beam and in the path of the air stream, and said beam being supported by said pillar at a height above ground as to avoid substantial sweeping of the air stream over the ground.

5. In an elevated monorail railroad construction in which a vehicle straddles a beam, a supporting construction comprising a single elongated unitary beam, means on said beam defining a smooth and rounded upper surface of the beam, means on said beam defining a smooth and rounded undersurface of the beam, a pillar supporting said beam, said pillar having means defining smooth curved surfaces merging into the undersurface of said beam, and having means defining smooth curved surfaces along a major portion of said beam adjacent said beam.

6. In an elevated monorail railroad construction, the combination comprising a single, elongated, unitary beam having a continuous outer boundary surface and adapted to function as the entire supporting and guiding track for a monorail vehicle; substantially vertical pillars supporting said beam on their upper ends; a monorail vehicle disposed straddling said beam and having spaced opposed depending portions receiving said beam between them; and means to facilitate high speed movement of said vehicle along said beam against the moving air masses incident to moving the vehicle at high speed, said means comprising said boundary surface being curved to define a smooth and rounded area at least along the entire undersurface of said beam; means on said depending portions of said vehicle defining curved surfaces on said vehicle cooperable with said beam to channel the moving air stream, and the upper ends of said pillars contiguous to the beam and in the path of moving air being generally elliptical in cross section and smoothly merged into the undersurface of said beam.

References Cited in the file of this patent

UNITED STATES PATENTS

| | | |
|---|---|---|
| 1,042,067 | Zsinko | Oct. 22, 1912 |
| 1,064,141 | Gorham | June 10, 1913 |
| 1,415,400 | Roghmanns | May 9, 1922 |
| 1,529,821 | Chiarelli | July 20, 1926 |
| 1,605,521 | Drake | Nov. 2, 1926 |
| 1,798,852 | Roghmanns | Mar. 31, 1931 |
| 1,811,270 | Henderson | June 23, 1931 |
| 2,056,217 | Stout | Oct. 6, 1936 |
| 2,093,535 | Adams et al. | Sept. 21, 1937 |